(12) United States Patent
Waibel

(10) Patent No.: US 7,966,232 B2
(45) Date of Patent: Jun. 21, 2011

(54) METHOD FOR THE COMPUTER-CONTROLLED IMPLEMENTATION OF A WORK PROCESS, AND DEVICE FOR IMPLEMENTING A WORK PROCESS

(75) Inventor: Ulrich Waibel, Vienna (AT)

(73) Assignee: Nuance Communications Austria GmbH, Vienna (AT)

( * ) Notice: Subject to any disclaimer, the term of this patent is extended or adjusted under 35 U.S.C. 154(b) by 2171 days.

(21) Appl. No.: 10/244,761

(22) Filed: Sep. 16, 2002

(65) Prior Publication Data

US 2003/0061135 A1    Mar. 27, 2003

(30) Foreign Application Priority Data

Sep. 26, 2001    (EP) ..................................... 01000498

(51) Int. Cl.
*G07F 19/00*    (2006.01)
*H04M 15/00*    (2006.01)
*G10L 15/00*    (2006.01)
*G10L 17/00*    (2006.01)

(52) U.S. Cl. ............................ 705/34; 704/231; 704/246
(58) Field of Classification Search ................... 705/34; 704/231, 246
See application file for complete search history.

(56) References Cited

U.S. PATENT DOCUMENTS

| | | | | |
|---|---|---|---|---|
| 5,875,436 | A | * | 2/1999 | Kikinis ............................ 705/34 |
| 6,604,124 | B1 | * | 8/2003 | Archbold ........................ 718/103 |
| 6,980,953 | B1 | * | 12/2005 | Kanevsky et al. ............. 704/235 |
| 2002/0133364 | A1 | * | 9/2002 | Grande et al. ..................... 705/1 |

* cited by examiner

*Primary Examiner* — F. Ryan Zeender
*Assistant Examiner* — Paul Danneman
(74) *Attorney, Agent, or Firm* — Wolf, Greenfield & Sacks, P.C.

(57) ABSTRACT

With the computer-aided performance of a work process in response to an order, in which billing information is prepared as a function of the urgency of the performance of the work process, automatically amended billing information is provided as a function of the urgency information supplied in the event of a change to the order of urgency after the placing of the order for the work process and the corresponding adaptation of the performance of the work process.

18 Claims, 2 Drawing Sheets

METHOD FOR THE COMPUTER-CONTROLLED IMPLEMENTATION OF A WORK PROCESS, AND DEVICE FOR IMPLEMENTING A WORK PROCESS

The invention relates to a method for the computer-aided performance of a work process in response to an order, in which billing information is prepared as a function of the urgency of the performance of the work process.

The invention relates to a device for the performance of a work process in response to an order, comprising means for the performance of the work process, means for the detection of the urgency information relating to the work process and means associated with this for the preparation of billing information which depends on the urgency of the work process.

It is customary, with the very widely differing work processes carried out in response to an order, such as, for example, a transcription of dictations by transcription services, to lay down the price for the work process instructed not as a function of the scope of the work but also as a function of the desired delivery date, a desired priority treatment, or a desired maximum time duration through to the supply of the results of the work process from the time of issue of the order, i.e. generally dependent on the individual urgency. For example, in the case of transcription of dictations, provision is made, according to the Internet document www.type4u.com/Pricing.html, in the case of an express performance of an order, that if the result is to be supplied in less than 24 hours, a 30% price surcharge is added, and for a particularly urgent order, if the result is to be supplied within 4 hours or less, a 50% price surcharge is added.

A similar situation to a transcription of dictations is provided, for example, by translation services, in particular if a translation of a text is initially prepared automatically with the aid of a translation program and the translated text is thereafter checked and revised manually, and likewise with service companies which carry out digital image processing to order on behalf of customers with the aid of image processing means, such as, for example, with the aid of a computer. Naturally, there are numerous other comparable services with urgency factors which can be thought of, such as the manufacture of goods to order, where delivery deadlines are specified.

A problem always arises with such work processes if subsequently, i.e. following the placement of an order with an urgency specification, the original urgency specification is changed by the customer, such as, for example, if a product must be obtained more rapidly due to reasons which have suddenly arisen. If, for example, the customer is a surgeon who earlier than originally planned suddenly needs the patient report which he has dictated in order to carry out an operation on a patient which has been brought forward, then he will inform the transcription service which was originally instructed accordingly to obtain the patient report earlier. This means a change in the urgency specification, which is to be taken into account not only in the performance of the work process, but also needs to be reflected in the preparation of the billing information. Another conceivable situation would then be, for example, if the customer is a lawyer who needs a translation of a document for legal proceedings later than was originally planned, in which case the translation, due, for example, to a postponement in the date of a court case, is not so urgently required as was originally planned.

It is therefore an object of the invention, in the context of the performance of work processes in response to an order, if the urgency information representing the urgency specifications is changed, that a high degree of flexibility is achieved as far as possible, in the sense of the reflection of the change of urgency in terms of the price.

In particular, it is the object of the invention to propose a method or device for the performance of a work process in response to an order with which, after the order has been issued with a specific urgency requirement, if a change of urgency requirement of the work process ordered is made possible, then, depending on the change of urgency and a corresponding adjustment of the performance of the work process in line with the change of urgency, price surcharges or price reductions can be rendered possible.

To achieve the object, the invention is characterized according to a first aspect in the following manner, namely:

A method for the computer-aided performance of a work process in response to an order, in which billing information is prepared as a function of the urgency of the performance of the work process, characterized in that after the ordering of the work process, in the event of a change of urgency, amended billing information which accords with the change of urgency is prepared after the adaptation of the performance of the work process.

This provides the advantage that an urgent customer requirement arising suddenly can be satisfied. The advantage is further achieved that, in the case of a company that is processing the order, an additional financial success can be forecast on the basis of the flexibility now provided while this sudden customer requirement is satisfied.

Preferably, the amended billing information in this context is prepared automatically as a function of the—amended—urgency information provided. This achieves the advantage that without human intervention and with the exclusion of the potential sources of error associated with this, objectively amended billing information can be prepared.

It is suitably also provided that the amended billing information is prepared as a function of the point of time of the change of the urgency information in reference to the state of execution of the work process. This provides the advantage that any work which is still to be carried out in the work process can be taken into account in an objective manner, up until the completion and delivery of the result of the work process.

For example, to take account also of the capacity in the case of an especially high degree of urgency being specified—in other words of available computing capacity with the computer and available work capacity with regard to the persons responsible—of a service unit ordered to carry out the work process, it is a further advantage when the amended billing information is prepared as a function of the full utilization of the service unit during the performance of the work process. As a result it is possible, for example, if considerable capacities are still free, that a work process is carried out on request even more quickly without a higher price being charged, or it may also happen that a delivery date which has suddenly become more urgent cannot be promised, because the capacities of the service unit with which the order has been placed do not allow for this.

It has also transpired to be particularly advantageous if, as a consequence of the change of urgency in the order, an acknowledgement of the adjustment of the performance of the work process and an acknowledgement of the amended billing information is effected. This achieves the advantage that the party placing the order is always informed of the performance of his order in respect of the change of urgency and the cost incurred in this respect, and effectively without long waiting times and without unattractive urgency measures.

In order to avoid negative surprises for a customer, it is also advantageous if, in connection with the change of urgency, a predetermined maximum computation value is taken into account in conjunction with the adaptation of the performance of the work process and the preparation of the amended billing information.

As can be deduced from the introductory remarks, the terms "urgency" and "urgency information" are in general to be understood as urgency indications relating to a period of time with regard to the supply of the result of the desired work process, in which in specific terms a desired point in time for the supply can be specified, or a period of time for the performance of the work process, up until the supply of the work process result, or standardized priority details, such as "especially urgent", "express", or the like. As a result of this, the advantage is obtained that, with the method, without restriction and in the most flexible possible manner, a large number of urgency requirements can be taken into account, represented with the aid of the urgency information.

The method for the computer-aided performance of the work process particularly relates to a data-processing method, such as a method for the transcription of a dictation, preferably when automatic means of transcription are used. In this situation, the spoken text is usually recognized with the aid of computer-aided processing by speech-recognition software, and automatically converted into a text file. This text file is then, in most cases, checked by a human being listening to the dictation and correcting by hand. This results in the decisive advantage that, even with a transcription of dictation, a degree of flexibility required by the customer can be taken into account, which is of particular interest especially in the medical sector. This is the case even if account is taken of the significant additional cost for the flexibility claimed, because additional cost for transcriptions in the medical sector is happily accepted in relation to the health of the patient, which has the main priority.

Another example of a preferred work process performed with the use of computer means is the preparation of a translation of a text, in which situation an automatic translation can be prepared with the aid of translation software, which supplies a translation text, whereafter the translation text obtained is checked by a human being on the basis of the source text and corrected manually as required.

Further examples of the use of the present invention are computer-controlled image processing techniques, for example for the photographic and film industry, or also for the assembly-line manufacture of articles, where the articles are manufactured to order; these articles can then be the most widely varied products, such as, for example, motor vehicles, but also plastic injection-molded components, articles of clothing, etc. In a practical manner the invention can also be applied to the manufacture and supply of foodstuffs, such as in the case of a pizza ordering service, where, for example, orders for the delivery of pizza products are placed via the Internet or by telephone, and secured by computer resources; these orders are then passed on by means of computer control to pizza baking facilities which are geographically favorably located, and where the preparation of the desired pizza is then arranged within the appropriate time frame; with the aid of the computer it is then also possible for a delivery service to be advised in good time, so that the pizza products can be delivered immediately after preparation. If, after the original order but still before the completion of manufacture, the time for delivery (in general terms, the urgency information) is changed due to changed circumstances at the customer, it is also possible in this case, as with the other examples cited, after a check of the status of the work process, to carry out the adjustment of said process, such as, for example, advance the time of the baking of the pizza product, to make use of amended billing information. The term "amended" billing information is in this case not to be understood to mean simply that billing information which is already available is subsequently altered, but quite generally that billing information is prepared which is different from the billing information that would have been obtained if the operating process were to have been carried out in accordance with the order and the original urgency information.

According to a second aspect, the invention can be characterized in the following manner, namely:

A device for the performance of a work process in response to an order, comprising means for the performance of the work process, means for detecting urgency information relating to the work process and representing urgency of the work process, and means for preparing billing information as a function of the urgency of the work process which means are associated with the means for detecting urgency information relating to the work process, characterized in that means are provided for the communication of urgency information changed after the ordering of the work process, wherein the means for receiving urgency information changed after the ordering of the work process are assigned to the means for the performance of the work process and are connected to the means for detecting the urgency information relating to the work process, and in that the means for the performance of the work process are arranged for adapting the performance of the work process in accordance with the changed urgency information, and in that the means for preparing billing information are arranged for preparing modified billing information after the performance of the work process has been adapted in accordance with the changed urgency information.

This enables the advantage to be obtained that a device for the performance of the method according to the invention is provided with the aid of which the most flexible possible reaction can be achieved to sudden customer wishes with regard to the urgency of an order.

To be able to check the possibility of adapting in a rational manner the performance of a work process in the event of a change in the urgency of the performance of a work process and accordingly take this into account for preparing the amended billing information, it is advantageous if means for retaining the current status of the work process are allocated to the means for the performance of the work process, to which means for the performance of the work process are connected the means for the preparation of billing information; it is further advantageous in this situation if means for retaining the respective degree of utilization of the means for the performance of the work process are assigned to the means for the performance of the work process, and the means for the preparation of the billing information are connected with these means for retaining the respective degree of utilization.

It has further proved to be advantageous if transmission means for returning a message regarding the amended billing information and regarding the adapted performance of the work process are connected to the means for the preparation of the billing information. This offers the advantage that a customer is always informed of the adaptation of the performance of the work process effected in connection with the changes in the urgency information, and of a change of cost from the work process adaptation.

These and other aspects of the invention are apparent from and will be elucidated with reference to a preferred embodiment described hereinafter, to which the invention is not, however, limited.

Figure 1:
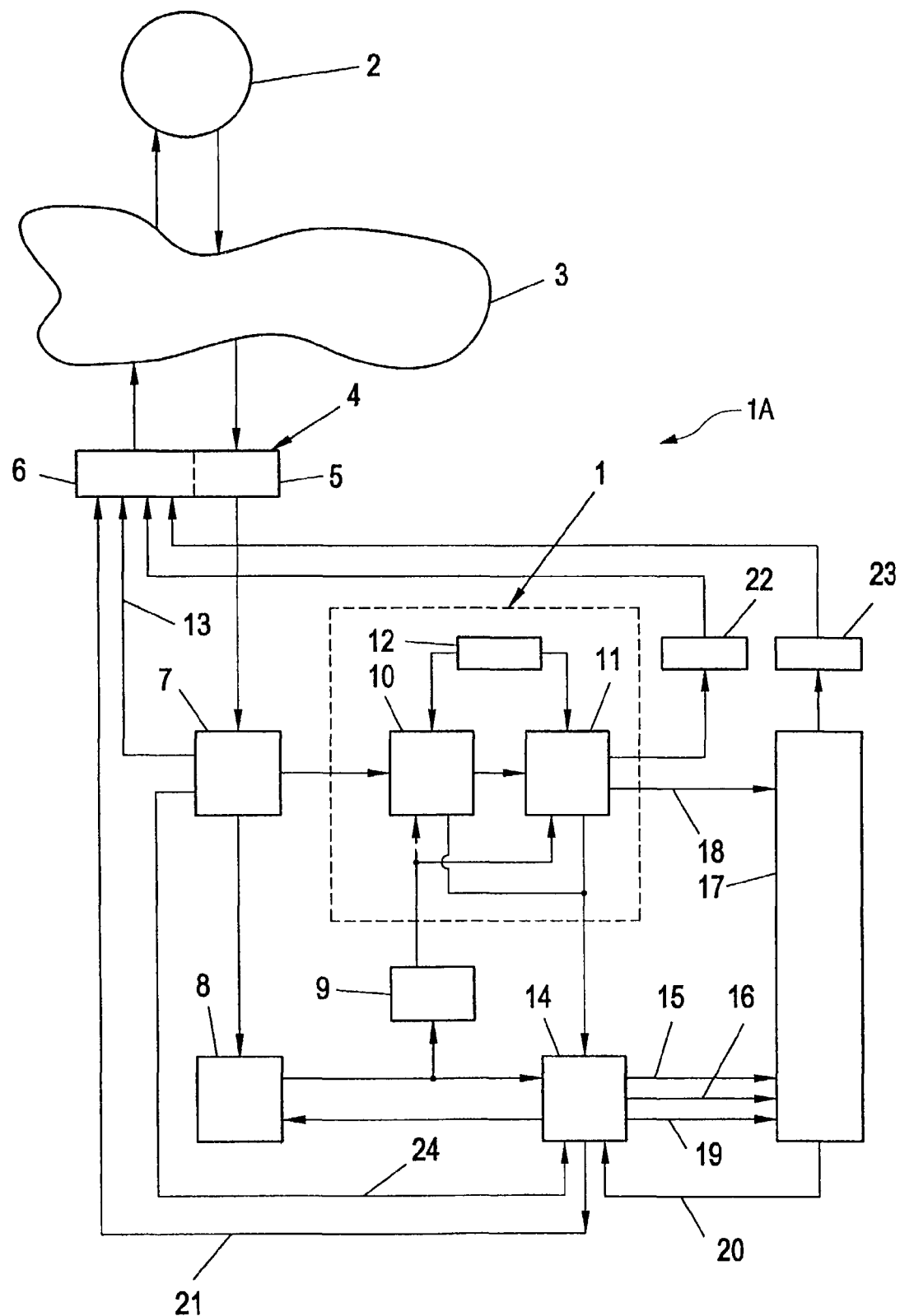
FIG. 1 shows in diagrammatic form a block circuit diagram of a device for the transcription of dictations in accordance with the embodiment of the invention, in which means are contained for taking account of a subsequent change of urgency of the performance of a transcription work process.

FIG. 1 shows a device 1A which is intended for the transcription of dictations and which for this purpose features dictation transcription means (hereinafter in brief the transcription means 1), forming the means for the performance of a work process, in which an order for the transcription of the dictation from a customer can be generated with the aid of a terminal 2, and transferred by means of a network 3, such as, for example, a WAN, a LAN, or the Internet, to the device 1A. The device 1A in the present case is provided with the aid of a computer. It may also be mentioned, however, that a network of computers may also be provided as a function of the number of work processes to be carried out, which computer network can be located in an office or an office building, or distributed in a decentralized way to various different locations within a company, which offers the transcription service of dictations referred to at the beginning of this paragraph. Within this network of computers it is also possible that individual computers or groups of computers are provided, which are connected to one another, for example with the aid of a virtual private network or with the aid of the Internet, and which, individually or in groups, form the transcription means 1 and further means of the device 1A, these means being described in greater detail hereinafter.

The order is received at an interaction unit 4 allocated to the transcription means 1, which unit contains the reception means 5 and transmission means 6, and are applied to the transcription means 1 via an interpretation unit 7. The interpretation unit 7 is designed to distinguish between a dictation file which is received and allocated to the order, and the urgency information received in connection with this, while the urgency information, such as, for example, an absolute delivery time, a duration of delivery, or general priority details, is applied to a priority unit 8 which forms means for detecting urgency information. The urgency information (delivery time, priority, etc.) is applied via communications means 9 to the transcription means 1, where this urgency information is accessible to a person responsible for the transcription result.

The transcription means 1 contain in a manner known per se speech recognition means 10, which provide a text file by automatic transcription on the basis of the dictation file with the aid of a computer and speech recognition software, in particular with access to speech samples stored in a databank, not shown in FIG. 1 on the one hand, and word-libraries on the other. This text file is applied to word processing means 11, where at least one person responsible checks the automatically-produced text file with the aid of the word processing means 11, and can correct it manually as required. For this purpose input means 12 are provided which are also arranged for starting the speech recognition software. The input means 12 are provided with the aid of a plurality of data stations, referred to as terminals, which are available for the processing of the text file via means for issuing the auditory information from the original dictation file and via means for visualizing the text-related information from the text file and by a keyboard for processing the text file.

The transcription means 1 are further arranged for determining the expenditure involved in the transcription of the dictation into a final text file. In this connection, the transcription means 1 are further arranged for producing and issuing expenditure information which represents this expenditure.

On receipt of an order, an identification code (an order number) is allocated to this order with the aid of the interpretation unit 7. With the aid of this order number the actual order, which is applied to the transcription means 1, and the urgency information, which is led to the priority unit 8, are allocated to one another in an unambiguous manner. The device 1A is additionally designed to report back the order number and for this purpose features a connection 13 which connects the interpretation unit 7 with the transmitting means 6. In the event of a subsequent change of urgency, the changed urgency is allocated to the respective work process with the aid of this order number. It may be observed that the allocation to an order of a subsequently made change of urgency of an order by a customer, or finding the identification code identifying the respective order, can, however, also be carried out in another way in the interpretation unit 7, such as, for example, on the basis of recognition of the customer or other details relating to the order. However, the use of an identification code is expedient for the work process as a whole at least within the device 1A. To this end, the interpretation unit 7 is arranged for issuing the identification code via the connection 24.

In the event of subsequent change of the urgency, on the basis of a change of customer requirement, if, for example, an order is needed earlier than was originally indicated, or if more time is available for this order, then this urgency information representing the changed urgency is likewise received and retained in the priority unit 8, or applied via the communication means 9 to the transcription means 1 and displayed there to the person responsible with the aid of a display screen of the word processing means 11, not shown in FIG. 1.

The status of the work process ordered, such as, for example, the status of the automatic transcription or the status of the checking and correction of the text file already produced by the automatic speech recognition means 10, is passed on continuously by the word processing means 11 to monitoring and control means 14, which also form means for retaining the status of the work process. The means for retaining the status of the work process are arranged here for the production and output of status information. The monitoring and control means 14 also form means for retaining the degree of utilization or capacity of the transcription means 1, with the aid of which the possibility of an especially urgent handling of an order can be detected, or, in the event of low degree of utilization and in the event of the sudden reception of a higher level of urgency of a work process, a substantial price increase can be suppressed. The means for retaining the degree of utilization or capacity of the transcription means 1 in this connection arranged for the production and delivery of capacity information. The status information and the capacity information is sent via connections 15 and 16 respectively, to means 17 for preparing billing information. In addition, the expenditure information is applied via a connection 18 to these means for the preparation of billing information 17. To achieve unambiguous identification of the work process, the monitoring and control means 14 are arranged for the direct reception of the identification code from the interpretation unit 7 via the connection 24 and for the processing of the identification code.

The transcription means 1 are further arranged for adapting the performance of the work process in accordance with the changed urgency information, this adaptation being attempted as a function of the particular status of the work process and/or the capacity available, so that, in a worst-case scenario, the work process originally present will be retained. In the event of the work process still being associated with the speech recognition means 10, the transcription means 1 will be formed in accordance with the changed urgency information in order to change the computing performance of the computer available for changing the speech recognition means 10. It may be mentioned that, with a network of computers, in the event of increased urgency, it is also possible to provide for the distribution of the speech recognition onto several computers. By analogy to this, in case of reduced urgency it is possible for the distributed speech recognition to be gathered onto a reduced number of computers engaged with speech recognition. As a result, it is possible for the performance of the work process to be speeded up or slowed down in the most efficient manner possible. In the event of the performance of the work process still being dependent on the word processing means 11, the transcription means 1 are designed, in accordance with the changed urgency, to change the human work capacity available to the word processing means 11. For this purpose, the word processing means 11 are designed for distributing the text file to be checked and, if appropriate, to be corrected, among several persons responsible for the transcription result, so that each of these persons rapidly provides an individual result, corresponding to the distribution.

The word processing means 11 are further arranged for producing the transcription result on the basis of the total of the individual results. In the case in question, these persons are located in an office. It may, however, be mentioned that they could also be located at the most widely different facilities of the company offering this service. It may also be mentioned in this connection that the input means 12 can also be designed to communicate with the aid of the interaction unit 4 or to communicate with a radio network, not shown in FIG. 1. This achieves the substantial advantage that these persons can also be located outside the company, as a result of which the performance of the work process in different time zones is rendered possible. This further achieves the advantage that it is possible to react with optimum flexibility to suddenly arising customer requirements, since, for example, for an order placed at 20:00 hours on the West Coast of the United States of America, USA for short, a transcription result required at 08:00 hours likewise on the West Coast can be prepared on time on the East Coast of the USA by a person working to the usual conditions and at normal working hours, without the company incurring extra costs for the performance of the work process, as would be the case if the transcription result were to be prepared on the West Coast during the night against a corresponding payment supplement. It may further be mentioned that appropriately qualified persons may also be distributed locally world wide, as a result of which practically the maximum flexibility possible can be offered for the service throughout the twenty-four hours.

In the event of such a change of urgency information, the monitoring and control means 14 arrange, via a connection 19, the means 17 for the preparation of billing information to take account of the changed urgency, provided that this is possible and/or necessary on the basis of the status information (via the connection 15) and the capacity information (via the connection 16). The means 17 for the preparation of billing information then indicates, while taking account of the information fed via a connection 20, a percentile price surcharge or a percentile price discount back to the monitoring and control means 14, and these monitoring and control means 14 then inform the customer, via a connection 21 and the transmitting means 6 of the interaction unit 4, as well as via the network 3, of the anticipated price of the finished transcribed dictation.

The device 1A further features first output means 22, which are designed to receive the result of the work process, i.e. the finished transcribed dictation, as a text file from the transcription means 1 and to output the text file to the customer via the interaction unit 4 and the network 3.

After the completion of the result of the work process, final billing information representing the entire work expenditure is prepared in the means 17 for preparing billing information after this entire work expenditure for the work process is known and output via second output means 23. The final billing information is likewise passed on to the customer via the interaction unit 4, i.e. its transmitting means 6, and via the network 3. In the event of the attempted adaptation of the performance of the work process not being possible due to the changed urgency, the transcription means 1 is further, with the aid of the second output means 23, arranged for informing the customer that the changed urgency information cannot be taken into account, and that, because no further change in the urgency information is being made, the performance of the work process will be continued in accordance with the original urgency information.

Figure 2:
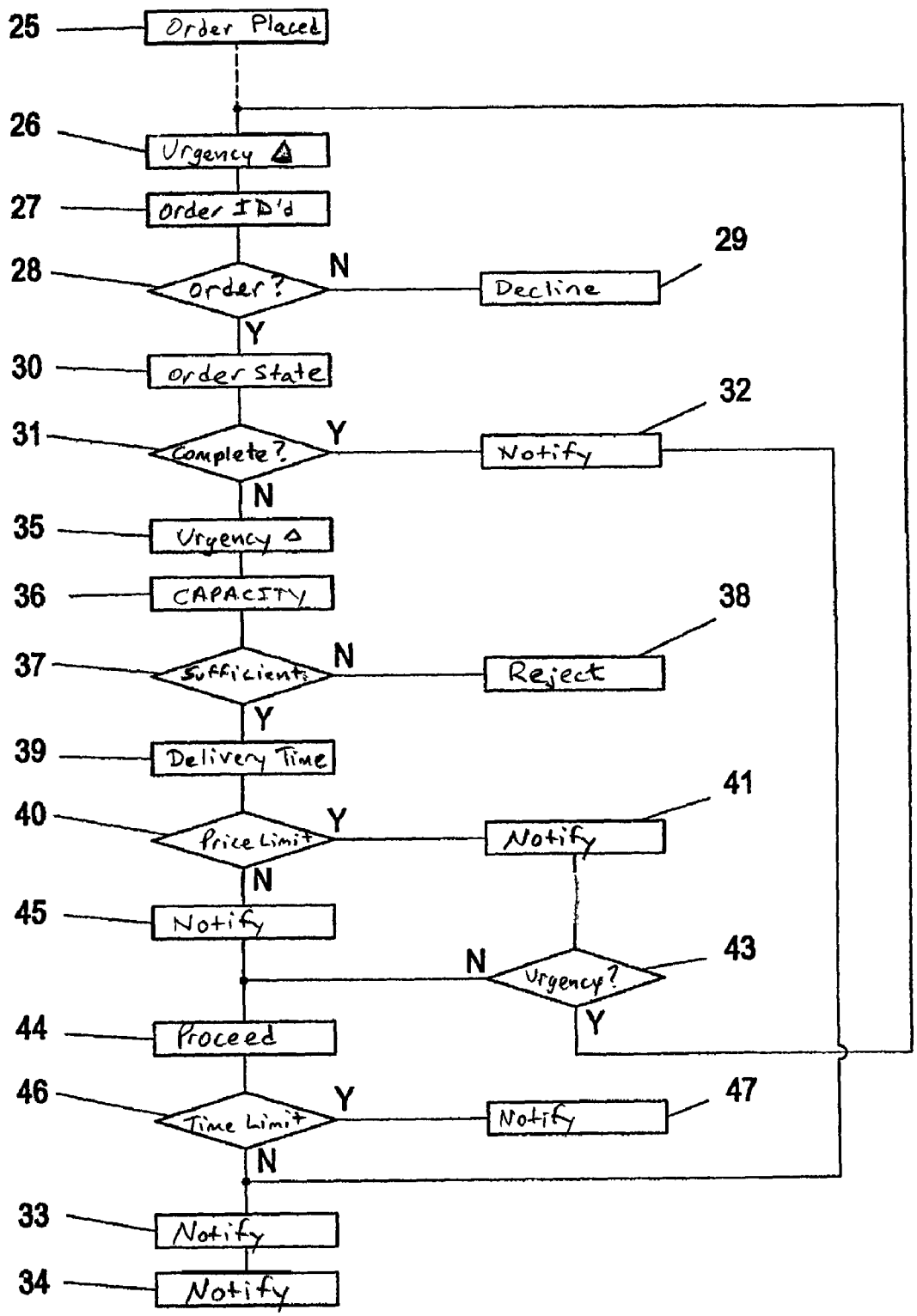
FIG. 2 shows, in the form of a flow chart to clarify the method of operation of the device according to FIG. 1 on the basis of an example of embodiment, the process stages taking place in the device in the event of a subsequent change of urgency of the performance of a work process.

In FIG. 2, as an example of the subsequent change of urgency of an order, a change in the time for the performance of a transcription order is shown in the form of a flow chart. In this situation, it is a precondition, with a block 25, that an order for a transcription of a dictation has already been placed, with a delivery time which represents the specified urgency, the dictation representing a patient report dictated by a surgeon.

After the placing of this order with the specified urgency, it is assumed that the urgency for the customer changes, because the surgeon, who needs the transcription of the dictated patient report for an operation—namely the result of a transcription work process—must carry out the operation at an earlier time than was originally planned because of medical complications. Accordingly, the surgeon changes the urgency for this order in a block 26. In the case in question, this change of urgency means a change in the absolute delivery time. It may be mentioned that this change of urgency can also relate to a change in turnaround time, or a general assignment of priority, such as, for example, from "urgent" to "very urgent". After this change in the urgency information at the block 26, said change being detected by the interpretation unit 7 represented in FIG. 1, the order concerned is identified in a block 27, which in the case in question is effected by the customer knowing an identification code which was notified to him when he placed the order, and issuing this when the urgency information is changed. It may be mentioned that the order of which the urgency is to be changed can also be identified, however, by the customer identifying himself by name and/or the customer naming the order with its title.

By way of precaution, an interrogation is made at a block 28, as to whether the order is indeed in hand, and, if this is not the case (output "N" of block 28), the request for changing the urgency is declined at a block 29.

If the order does exist (output "Y" of block 28), then an order status, i.e. the state of the transcription work process originally ordered at block 25, is determined at a block 30 (see the monitoring and control means 14 in FIG. 1), and an interrogation is then made at a block 31 as to whether the order, i.e. the transcription work process, has already been completed or not. If the order has already been completed (output "Y" of block 31), this is notified to the customer at a block 32; in addition, the completed result of the transcription work process is notified to the customer at a block 33, and billing information prepared on the basis of the original urgency information is notified to the customer in accordance with a block 34.

However, if it is determined when checking the block 31 that the order has not yet been completed, then the changed urgency information is held in a block 35, and the new delivery time deriving from this is determined, after which the capacity available for carrying out the work process is determined in a block 36. An interrogation is then made at a block 37 as to whether the capacity is sufficient for carrying out the transcription work process within the new time specification, and, if it is not, a corresponding rejection is sent to the customer at a block 38. If the capacity is sufficient, by contrast, the new delivery time is displayed at a block 39 (see the communication means 9 in FIG. 1) and, if appropriate, a price surcharge is determined and estimated, provisionally amended billing information prepared and with regard to the final work expenditure, which is not yet known, an interrogation is then made at a block 40 as to whether a price limit has been specified by the customer, and whether this price limit will be exceeded by the—provisionally—amended billing information. If the price limit is exceeded, a corresponding notification is sent to the customer at a block 41. A notification is further issued at a block 43 to the effect that, with regard to the exceeding of the time limit if the order is carried out within the new time limit, the order will be carried out in accordance with the original time-dependent conditions, i.e. in accordance with the original urgency information.

An interrogation is effected at a block 43 as to whether the customer wishes to make another change in the urgency information, in which case block 26 is returned to, or whether the customer agrees with the performance of the transcription in accordance with the original urgency information or, alternately, with the price limit being exceeded, so that the transcription work process can be carried out in accordance with the urgency information changed by the customer. For the further performance of the work process ordered in accordance with the urgency information which applies in each individual case, a block 44 is then proceeded to.

However, if it transpires during the check at the block 40 that a price limit does not pertain, or is not being exceeded, then the amended billing information will be notified to the customer at a block 45, and the transcription work process is then carried out at the block 44 in accordance with the changed urgency information or brought to a conclusion.

Finally, an interrogation is made at a block 46 as to whether the specified delivery time has been exceeded. If it has not, then, in accordance with the blocks 33 and 34 already mentioned, the result of the transcription and the amended billing information is passed on to the customer as the definitive billing information.

By contrast, if the specified time for the performance of the transcription ordered cannot be respected, for example due to complications in the checking or correction of the text file, then a separate message is issued to the customer at a block 47.

For determining the price, i.e. for preparing the (amended) billing information, the turnaround time required is used (apart from the general scope of work): The shorter this turnaround time, the higher the price or a price surcharge which determines the price. In this situation, as already mentioned, when the billing information is prepared, i.e. the price is determined, the degree of utilization can be taken into account while in particular a price discount for deliveries of the work process results is conceivable during times of low utilization. It is also possible, however, for a price surcharge to be effected right from the outset for deliveries of work process results at predetermined peak times which relate to the degree of utilization.

If it is established at a block 46 that an order cannot be carried out within the time desired by the customer (see block 46), for example if a person carrying out the word processing suddenly becomes indisposed, provision can also be made for the customer to receive a credit note, which in turn can be calculated as a function of the delay in the delivery of the work process result.

These computer parameter assessments and evaluations referred to previously are carried out essentially with the aid of the monitoring and control means 14, represented in FIG. 1, which can be regarded as a central parameter and control module for the performance of work processes with changes in urgency at the device 1A according to FIG. 1.

As already mentioned, comparable processes are conceivable in the preparation of translations of predetermined specified texts, as are orders for image processing in the photo and film industry; in addition to this, the manufacture and delivery of goods, including foodstuffs, can also be included, with a comparable system control with computer support pertaining. An especially preferred application situation is, however, the performance of transcriptions from dictations, as described previously.

The invention claimed is:

1. A method for computer-aided assistance in performing a transcription of a recorded dictation in response to an order for the recorded dictation to be transcribed, the method comprising:
   receiving the order including urgency information relating to a requested time for completing the transcription;
   determining billing information for the order based, at least in part, on the urgency information;
   receiving a change in the urgency information relating to completing the transcription after receiving the order with the urgency information; and
   automatically amending using a computer, the billing information for the order based, at least in part, on the change in the urgency information.

2. A method as claimed in claim 1, further comprising automatically recognizing the recorded dictation using speech recognition software to create a text file of the recorded dictation, and wherein completing the transcription includes correcting errors in the text file.

3. A method as claimed in claim 2, wherein automatically amending the billing information is further based, at least in part, on a point of time at which the change in the urgency information is received in relation to a status of completing the transcription.

4. A method as claimed in claim 2, wherein automatically amending the billing information is further based, at least in part, on an availability of personnel to complete the transcription according to the change in the urgency information.

5. A method as claimed in claim 2, further comprising transmitting a response to the change of the urgency information.

6. A method as claimed in claim 2, wherein the urgency information includes a desired point of time for completing the transcription.

7. A method as claimed in claim 6, wherein the urgency information includes a priority indicator relating to a priority of completing the transcription.

8. A method as claimed in claim 2, wherein the urgency information includes a time duration for completing the transcription.

9. A method as claimed in claim 5, wherein transmitting the response includes transmitting an acceptance including the amended billing information if the transcription can be completed in accordance with the change in the urgency information.

10. A method as claimed in claim 5, wherein transmitting the response includes transmitting an indication that the transcription cannot be completed in accordance with the change in the urgency information.

11. A method in claim 10, wherein transmitting the response includes transmitting an indication that the transcription will be completed according to the urgency information prior to the change.

12. A device for assistance in performing a transcription of a recorded dictation in response to an order for the recorded dictation to be transcribed, comprising:
    means for receiving the order including urgency information related to a requested time for completing the transcription;
    means for preparing billing information for the order based, at least in part, on the urgency information;
    means for receiving a change in the urgency information relating to completing the transcription after receiving the order with the urgency information; and
    means for automatically preparing modified billing information for the order based, at least in part, on change in the urgency information.

13. A device as claimed in claim 12, further comprising means for automatically recognizing the recorded dictation using speech recognition software to create a text file of the recorded dictation, and wherein completing the transcription includes correcting errors in the text file.

14. A device as claimed in claim 12, wherein the means for automatically preparing the modified billing information includes means for automatically preparing the modified billing information based, at least in part, on a point in time at which the change in the urgency information is received relative to a status of completing the transcription.

15. A device as claimed in claim 14, wherein the means for automatically preparing the modified billing information is further based, at least in part, on availability of personnel to complete the transaction according to the change in the urgency information.

16. A device as claimed in claim 12, further comprising means for sending back a message in response to the change in the urgency information.

17. A device as claimed in claim 16, wherein the means for sending back a message includes means for sending back a message including the modified billing information if the transcription can be completed according to the change in the urgency information.

18. A device as claimed in claim 16, wherein the means for sending back a message includes means for sending back a message indicating that the transcription will be completed according to billing information prior to the change in urgency information when the transcription cannot be completed according to the change in the urgency.

* * * * *